United States Patent
Parashar et al.

(10) Patent No.: US 10,739,774 B2
(45) Date of Patent: Aug. 11, 2020

(54) KEYFRAME BASED AUTONOMOUS VEHICLE OPERATION

(71) Applicant: Honda Motor Co., Ltd., Tokyo (JP)

(72) Inventors: Priyam Parashar, San Diego, CA (US); Kikuo Fujimura, Palo Alto, CA (US); Alireza Nakhaei Sarvedani, Sunnyvale, CA (US); Akansel Cosgun, Melbourne (AU)

(73) Assignee: Honda Motor Co., Ltd., Tokyo (JP)

( * ) Notice: Subject to any disclaimer, the term of this patent is extended or adjusted under 35 U.S.C. 154(b) by 306 days.

(21) Appl. No.: 15/947,210

(22) Filed: Apr. 6, 2018

(65) Prior Publication Data

US 2019/0107839 A1    Apr. 11, 2019

Related U.S. Application Data

(60) Provisional application No. 62/569,431, filed on Oct. 6, 2017.

(51) Int. Cl.
  *G05D 1/02* (2020.01)
  *G06K 9/00* (2006.01)
  *B60W 30/00* (2006.01)

(52) U.S. Cl.
  CPC .......... *G05D 1/0219* (2013.01); *B60W 30/00* (2013.01); *G05D 1/0223* (2013.01); *G05D 1/0253* (2013.01); *G05D 1/0257* (2013.01); *G06K 9/00798* (2013.01); *G06K 9/00805* (2013.01)

(58) Field of Classification Search
  CPC ... B60W 30/00; G05D 1/0223; G05D 1/0219; G05D 1/0257; G05D 1/0253; G06K 9/00805; G06K 9/00798
  See application file for complete search history.

(56) References Cited

U.S. PATENT DOCUMENTS

| | | |
|---|---|---|
| 8,843,236 B2 | 9/2014 | Barajas et al. |
| 9,070,202 B2 | 6/2015 | Chandraker et al. |
| 9,403,273 B2 | 8/2016 | Payton et al. |
| 9,737,990 B2 | 8/2017 | Feniello et al. |

(Continued)

OTHER PUBLICATIONS

Baris Akgun, Maya Cakmak, Karl Jiang, and Andrea L Thomaz. Keyframe-based learning from demonstration. International Journal of Social Robotics, 4(4):343-355, 2012.

(Continued)

*Primary Examiner* — Ramsey Refai

(74) *Attorney, Agent, or Firm* — Rankin, Hill & Clark LLP

(57) ABSTRACT

According to one aspect, keyframe based autonomous vehicle operation may include collecting vehicle state information and collecting environment state information. A size of an object within the environment, a distance between the object and the autonomous vehicle, and a lane structure of the environment through which the autonomous vehicle is travelling may be determined. A matching keyframe model may be selected based on the size of the object, the distance from the object to the autonomous vehicle, the lane structure of the environment, and the vehicle state information. Suggested limits for a driving parameter associated with autonomous vehicle operation may be generated based on the selected keyframe model. The autonomous vehicle may be commanded to operate autonomously according to the suggested limits for the driving parameter.

20 Claims, 7 Drawing Sheets

(56) References Cited

U.S. PATENT DOCUMENTS

| | | | |
|---|---|---|---|
| 9,760,827 | B1 | 9/2017 | Lin et al. |
| 2013/0325202 | A1 | 12/2013 | Howard et al. |
| 2014/0201126 | A1 | 7/2014 | Zadeh et al. |
| 2016/0048978 | A1* | 2/2016 | Jachalsky ............ G06K 9/4604 382/195 |
| 2018/0150701 | A1* | 5/2018 | Kang ........................ G06N 3/08 |

OTHER PUBLICATIONS

Brenna D Argall, Sonia Chernova, Manuela Veloso, and Brett Browning. A survey of robot learning from demonstration. Robotics and autonomous systems, 57(5):469-483, 2009.

Christopher G Atkeson and Stefan Schaal. Robot learning from demonstration. 97:12-20, 1997.

Donald J Berndt and James Clifford. Using dynamic time warping to find patterns in time series. 10(16):359-370, 1994.

Mariusz Bojarski, Davide Del Testa, Daniel Dworakowski, Bernhard Firner, Beat Flepp, Prasoon Goyal, Lawrence D Jackel, Mathew Monfort, Urs Muller, Jiakai Zhang, et al. End to end learning for self-driving cars. arXiv preprint arXiv:1604.07316, 2016.

KW Brodlie and Sohail Butt. Preserving convexity using piecewise cubic interpolation. Computers & Graphics, 15 (1):15-23, 1991.

Chenyi Chen, Ari Seff, Alain Kornhauser, and Jianxiong Xiao. Deepdriving: Learning affor- dance for direct perception in autonomous driving. pp. 2722-2730, 2015.

Frederick N Fritsch and Ralph E Carlson. Monotone piecewise cubic interpolation. SIAM Journal on Numerical Analysis, 17(2):238-246, 1980.

David Isele, Akansel Cosgun, Kaushik Subramanian, and Kikuo Fujimura. Navigating in- tersections with autonomous vehicles using deep reinforcement learning. arXiv preprint arXiv:1705.01196, 2017.

Stefan Mitsch, Khalil Ghorbal, and André Platzer. On provably safe obstacle avoidance for autonomous robotic ground vehicles. 2013.

Stéphane Ross, Geoffrey J Gordon, and Drew Bagnell. A reduction of imitation learning and structured prediction to no-regret online learning. pp. 627-635, 2011.

Dorsa Sadigh, Shankar Sastry, Sanjit A Seshia, and Anca D Dragan. Planning for autonomous cars that leverage effects on human actions. 2016.

Junqing Wei, Jarrod M Snider, Junsung Kim, John M Dolan, Raj Rajkumar, and Bakhtiar Litkouhi. Towards a viable autonomous driving research platform. pp. 763-770, 2013.

Tianhao Zhang, Gregory Kahn, Sergey Levine, and Pieter Abbeel. Learning deep control policies for autonomous aerial vehicles with mpc-guided policy search. pp. 528-535, 2016.

Brian D Ziebart, Andrew L Maas, J Andrew Bagnell, and Anind K Dey. Maximum entropy inverse reinforcement learning. 8:1433-1438, 2008.

\* cited by examiner

KEYFRAME BASED AUTONOMOUS VEHICLE OPERATION

CROSS-REFERENCE TO RELATED APPLICATIONS

This application claims the benefit of U.S. Provisional Patent Application, Ser. No. 62/569,431 entitled "LEARNING GENERALIZABLE AUTONOMOUS DRIVING CONSTRAINTS USING KEYFRAMES AND VARIATIONS FROM USER DEMONSTRATIONS", filed on Oct. 6, 2017; the entirety of the above-noted application(s) is incorporated by reference herein.

BACKGROUND

Autonomous vehicles may include automatic driving systems which facilitate autonomous driving. For example, trajectory planning may be utilized when other vehicles or pedestrians move around the autonomous vehicle in predictable ways. However, unexpected situations or scenarios may arise during autonomous operation of the autonomous vehicle.

BRIEF DESCRIPTION

According to one aspect, a system for keyframe based autonomous vehicle operation may include a sensor, a feature extractor, a reasoning logic, and an electronic control unit (ECU). The sensor may collect vehicle state information associated with an autonomous vehicle and environment state information, the environment state information including information associated with an occlusion object located in an environment through which the autonomous vehicle is travelling. The feature extractor may determine a size of the occlusion object, a distance between the occlusion object and the autonomous vehicle, and a lane structure of the environment through which the autonomous vehicle is travelling. The reasoning logic may select a matching keyframe model from a set of keyframe models based on the size of the occlusion object, the distance from the occlusion object to the autonomous vehicle, the lane structure of the environment, and the vehicle state information. The reasoning logic may generate a maximum suggested limit and a minimum suggested limit for a driving parameter associated with autonomous vehicle operation based on the selected keyframe model, the vehicle state information, the size of the occlusion object, the distance from the occlusion object to the autonomous vehicle, and the lane structure of the environment. The ECU may command the autonomous vehicle to operate autonomously according to the maximum suggested limit and the minimum suggested limit for the driving parameter.

The vehicle state information may include a position of the autonomous vehicle, a heading of the autonomous vehicle, and a velocity of the autonomous vehicle. The environment state information may include a position of the occlusion object. The lane structure of the environment may include a two lane road structure or a four lane road structure. The ECU may command the autonomous vehicle to operate autonomously according to the maximum suggested limit and the minimum suggested limit for the driving parameter when a position of the autonomous vehicle is less than a threshold distance to a position of the occlusion object. The ECU may command the autonomous vehicle to disregard the maximum suggested limit and the minimum suggested limit for the driving parameter after the autonomous vehicle has passed the occlusion object but is within the threshold distance to the position of the occlusion object.

The set of keyframe models may be built based on third order splines or fifth order splines. The vehicle state information may include a position of the autonomous vehicle which is defined in terms of a sub-lane within a lane through which the autonomous vehicle is travelling. The sensor may include a radar unit, a light detection and ranging (LIDAR) unit, or an image capture sensor. The driving parameter may be a velocity, an acceleration, or a steering angle of the autonomous vehicle.

According to one aspect, a system for keyframe based autonomous vehicle operation may include a sensor, a feature extractor, a reasoning logic, and an electronic control unit (ECU). The sensor may collect vehicle state information associated with an autonomous vehicle and environment state information, the environment state information including information associated with an object located in an environment through which the autonomous vehicle is travelling. The feature extractor may determine a size of the object, a distance between the object and the autonomous vehicle, and a lane structure of the environment through which the autonomous vehicle is travelling. The reasoning logic may select a matching keyframe model from a set of keyframe models based on the size of the object, the distance from the object to the autonomous vehicle, the lane structure of the environment, and the vehicle state information. The reasoning logic may generate a maximum suggested limit and a minimum suggested limit for a driving parameter associated with autonomous vehicle operation based on the selected keyframe model, the vehicle state information, the size of the object, the distance from the object to the autonomous vehicle, and the lane structure of the environment. The ECU may command the autonomous vehicle to operate autonomously according to the maximum suggested limit and the minimum suggested limit for the driving parameter.

The ECU may command the autonomous vehicle to operate autonomously according to the maximum suggested limit and the minimum suggested limit for the driving parameter when a position of the autonomous vehicle is less than a threshold distance to a position of the object. The set of keyframe models may be built based on third order splines or fifth order splines. The vehicle state information may include a position of the autonomous vehicle which is defined in terms of a sub-lane within a lane through which the autonomous vehicle is travelling. The sensor may include a radar unit, a light detection and ranging (LIDAR) unit, or an image capture sensor. The driving parameter may be a velocity, an acceleration, or a steering angle of the autonomous vehicle.

According to one aspect, a computer implemented method for keyframe based autonomous vehicle operation may include collecting vehicle state information associated with an autonomous vehicle and environment state information, the environment state information including information associated with an object located in an environment through which the autonomous vehicle is travelling, determining a size of the object, a distance between the object and the autonomous vehicle, and a lane structure of the environment through which the autonomous vehicle is travelling, selecting a matching keyframe model from a set of keyframe models based on the size of the object, the distance from the object to the autonomous vehicle, the lane structure of the environment, and the vehicle state information, generating a maximum suggested limit and a minimum suggested limit for a driving parameter associated with autonomous vehicle operation based on the selected keyframe model, the vehicle state information, the size of the object, the distance from the object to the autonomous vehicle, and the lane structure of the environment, and commanding the autonomous vehicle to operate autonomously according to the maximum suggested limit and the minimum suggested limit for the driving parameter.

The method may include collecting environment state information including information associated with a second object located in the environment through which the autonomous vehicle is travelling, determining a size of the second object and a distance between the second object and the autonomous vehicle, and selecting the keyframe model from the set of keyframe models based on the size of the object and the size of the second object, a distance from an average centered position of the object and the second object to the autonomous vehicle, the lane structure of the environment, and the vehicle state information. The vehicle state information may include a position of the autonomous vehicle, a heading of the autonomous vehicle, and a velocity of the autonomous vehicle. The environment state information may include a position of the object.

DETAILED DESCRIPTION

Figure 1:
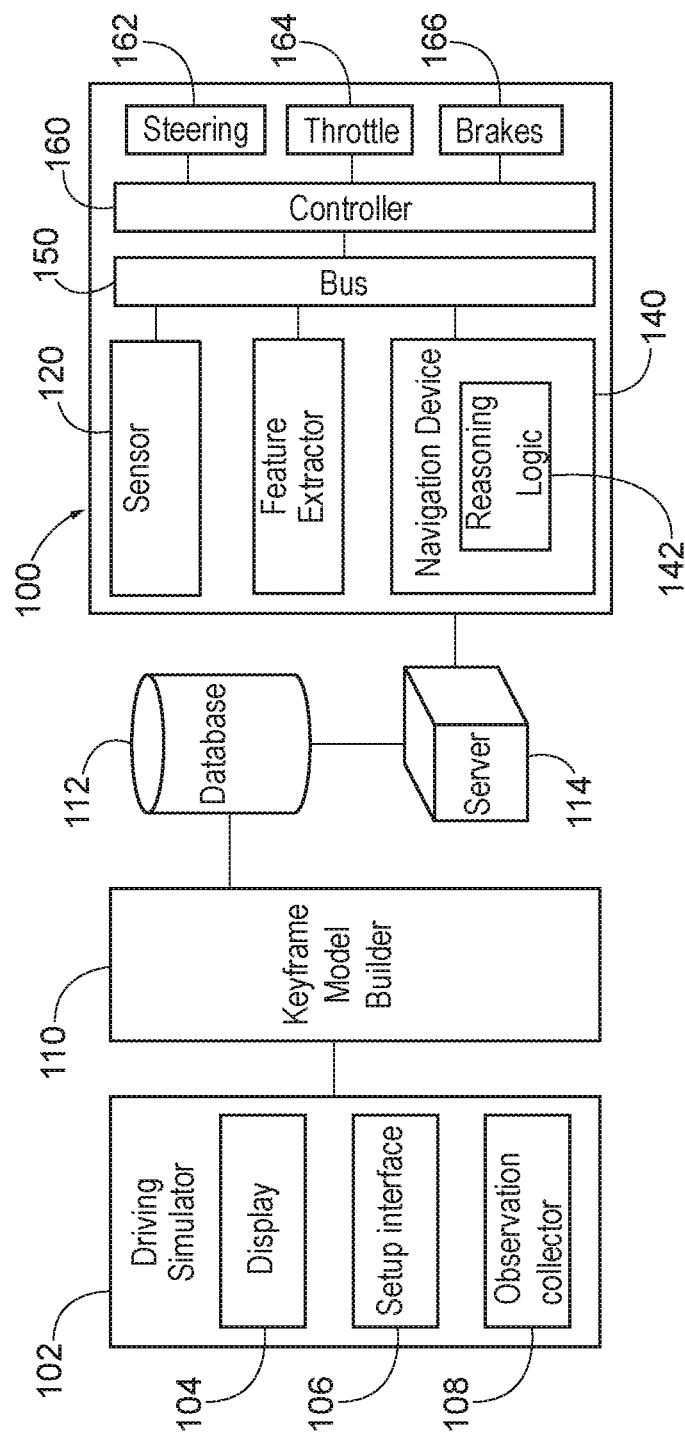
FIG. 1 is an illustration of an example component diagram of a system for keyframe based autonomous vehicle operation, according to one aspect.

The following terms are used throughout the disclosure, the definitions of which are provided herein to assist in understanding one or more aspects of the disclosure.

"Vehicle", as used herein, refers to any moving vehicle that is capable of carrying one or more human occupants and is powered by any form of energy. In some cases, a motor vehicle includes one or more engines. The term "vehicle" may also refer to an autonomous vehicle and/or self-driving vehicle powered by any form of energy. The vehicle may carry one or more human occupants or other cargo. Further, the term "vehicle" may include vehicles that are automated or non-automated with pre-determined paths or free-moving vehicles.

"Operating environment", as used herein, may include one or more roadways, road segments, other vehicles, objects, obstacles, obstructions, animals, construction, debris, potholes, traffic barrels, traffic cones, etc. Some objects may be occluded by other objects, referred to as "occlusion objects". Occlusion objects may be stationary or static, or be moving objects, such as other vehicles.

"Module" or "component", as used herein, includes, but is not limited to, a non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module or a component may include logic, a software controlled microprocessor, a discrete logic circuit, an analog circuit, a digital circuit, a programmed logic device, a memory device containing executing or executable instructions, logic gates, a combination of gates, and/or other circuit components, such as the modules, systems, devices, units, or any of the components of FIG. 1. Multiple modules or components may be combined into one module or component and a single module or component may be distributed among multiple modules or components.

"Bus", as used herein, refers to an interconnected architecture that is operably connected to other computer components inside a computer or between computers. The bus may transfer data between the computer components. The bus may be a memory bus, a memory processor, a peripheral bus, an external bus, a crossbar switch, and/or a local bus, among others. The bus may also be a vehicle bus that interconnects components inside a vehicle using protocols such as Media Oriented Systems Transport (MOST), Controller Area Network (CAN), Local Interconnect network (LIN), among others.

"Communication", as used herein, refers to a communication between two or more computing devices (e.g., computer, personal digital assistant, cellular telephone, network device) and/or components and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

"Operable connection", as used herein, or a connection by which entities are "operably connected", is one in which signals, physical communications, and/or logical communications may be sent and/or received. An operable connection may include a wireless interface, a physical interface, a data interface, and/or an electrical interface. For example, one or more of the components of FIG. 1 may be operably connected with one another, thereby facilitating communication therebetween.

"Infer" or "inference", as used herein, generally refers to the process of reasoning about or inferring states of a system, a component, an environment, a user from one or more observations captured via events or data, etc. Inference may be employed to identify a context or an action or may be employed to generate a probability distribution over states, for example. An inference may be probabilistic. For example, computation of a probability distribution over states of interest based on a consideration of data or events. Inference may also refer to techniques employed for composing higher-level events from a set of events or data. Such inference may result in the construction of new events or new actions from a set of observed events or stored event data, whether or not the events are correlated in close temporal proximity, and whether the events and data come from one or several event and data sources.

FIG. 1 is an illustration of an example component diagram of a system 100 for keyframe based autonomous vehicle operation, according to one aspect.
Simulation The system 100 for keyframe based autonomous vehicle operation may use one or more keyframe models to command an autonomous vehicle or otherwise operate the autonomous vehicle in an autonomous fashion. These keyframe models may be built based on observations, learning from demonstration, or learning by demonstration during a simulation phase. Because the simulation may be done on a driving simulator 102 or in a controlled environment, the system 100 for keyframe based autonomous vehicle operation may learn from models which may be created without trial and error, thereby mitigating actual collisions from occurring during the simulation phase.

The driving simulator 102 may include a display 104, a setup interface 106, and an observation collector 108. Additionally, the driving simulator 102 may be setup to capture or observe one or more driving characteristics across a cross-section of conditions or different scenarios. Stated another way, the driving simulator 102 may create a simulation of one or more different target driving scenarios. These driving scenarios may include an object, occlusion object, or other road-side obstacle, pedestrians on sidewalks, pedestrians in crosswalks, or pedestrians associated with the occlusion object. For example, in this simulation phase, a pedestrian hidden from a driver of a vehicle, may step out from behind the occlusion object, forcing the driver to change course. Based on observations collected from the observation collector 108, one or more keyframe models may be built. In this way, the driving simulator 102 may collect data from human participants during the simulation phase which may be used to model how an autonomous vehicle may react when a previously unobserved pedestrian or object suddenly appears from an occluded area (e.g., the occlusion object).

One of the benefits of the system 100 for keyframe based autonomous vehicle operation is that the autonomous vehicle may react prior to detecting an object or pedestrian by determining that an object is an occlusion object associated with a risk of having a pedestrian hidden behind that object. Further, unlike a real-life training scenario, no unfavorable situations (e.g., crashes or collisions) are required to train the keyframe models.

The setup interface 106 may be utilized to setup the simulation based on one or more occlusion factors (e.g., independent variables which may be adjusted). These occlusion factors may be factors which affect driving behavior. For example, the occlusion factors may include a size of the occlusion object, a distance from the occlusion object to the autonomous vehicle, and a lane structure of an environment through which the autonomous vehicle is travelling. The setup interface 106 may be configured to setup the simulation so that it appears to the human participant that the occlusion object (e.g., which may be another vehicle) falls within a first size category, a second size category, a third size category, etc. In other words, the setup interface 106 may be used to adjust the size of the occlusion object (small, medium, large, etc.). Although the size of the occlusion object (or occlusion vehicle, as described herein) is discussed with reference to the first or second size (e.g., moderate or large), it will be appreciated that the setup interface 106 may allow for additional size categories, as desired.

Similarly, the setup interface 106 may configure the distance between the occlusion object and the vehicle to be within a first distance range, a second distance range, a third distance range, etc. In other words, the setup interface 106 may be used to adjust the distance between the occlusion object and the vehicle being driven by the human participant (close (<1 m), medium (2 m-3 m), far (>3 m), etc.). Although the distance between the occlusion object and the vehicle is discussed with reference to the first or second distance (e.g., close or far), it will be appreciated that the setup interface 106 may allow for additional distance ranges, as desired.

The setup interface 106 may also adjust the lane structure of the roadway or environment of the vehicle during the simulation. Stated another way, the setup interface 106 may be used to modify whether there is traffic in a lane immediately right of the driving lane of the vehicle. Explained yet again, this means that the setup interface 106 may enable the roadway of the simulation to appear as a unidirectional road, a bidirectional road, as a two lane road, as a four lane road, etc. Although the lane structure is discussed as being a two lane road structure or a four lane road structure herein, it will be appreciated that the setup interface 106 may enable a variety of lane structures to be setup for the simulation.

In this way, the setup interface 106 may be used to control one or more independent variables (i.e., the occlusion factors) associated with the simulation phase, and in connection with the system 100 for keyframe based autonomous vehicle operation. Assuming that each of the three aforementioned independent variables (e.g., size of object, distance from object to vehicle, and lane structure) are controlled to have two setups (e.g., moderate vs large, close vs far, two lane vs four lane), eight different (i.e., $2^3$) possible simulation scenarios (and thus keyframe models) may be created. It should be noted that additional scenarios and keyframe models may be created by adding additional categories for one or more of the independent variables or by adding additional independent variables (e.g., weather, visibility, road conditions, etc.). One or more of the independent variables may be tested for significance based on t-test and Wilcoxon's test for different human drivers.

A number of human drivers may take one or more simulation runs through each of the different possible simulation scenarios described above, and the observation collector 108 may record one or more driving characteristics for each of the different simulation scenarios. Stated another way, the observation collector 108 may capture one or more driving characteristics (e.g., a velocity, an acceleration, or a steering angle, etc.) associated with a first model (moderate occlusion object, close to vehicle (within 1 m), on a two lane road) while a human driving is navigating in that corresponding simulation environment. The observation collector 108 may capture these driving characteristics for a second model (large occlusion object, close to vehicle (within 1 m), on a two lane road), a third model (moderate occlusion object, far from vehicle (>3 m), on a two lane road), a fourth model (large occlusion object, far from vehicle (>3 m), on a two lane road), a fifth model (moderate occlusion object, close to vehicle (within 1 m), on a four lane road), a sixth model (large occlusion object, close to vehicle (within 1 m), on a four lane road), a seventh model (moderate occlusion object, far from vehicle (>3 m), on a four lane road), an eighth model (large occlusion object, far from vehicle (>3 m), on a four lane road), etc. In this way, keyframe models may be built for each of the different scenarios.

The driving characteristics may be stored on the observation collector 108 or on a database 112 of a server 114 prior to keyframe model generation. Because the driving characteristics of a number of human drivers may be captured, the response driving characteristics to each of the differently modeled scenarios (e.g., created by the setup interface 106) may be captured for a general population and the system 100 for keyframe based autonomous vehicle operation may thus learn how or what a generally appropriate response to a corresponding scenario should look like. The driving characteristics may include the position of the training vehicle within the simulation, the position of the object, the heading of the training vehicle, the velocity of the training vehicle, size of the occlusion object, the nature or type of road or lane structure, road lane limits, etc. According to one aspect, the position of the training vehicle within the simulation may be broken down or defined by a sub-lane position, where each sub-lane has a predetermined width (e.g., 0.2 m, 0.25 m, 0.5 m, etc.). Sub-lanes may also be defined by a number N, where 0 is the sub-lane closest to the occlusion object and N is the sub-lane farthest from the occlusion object. Thus, the vehicle state information may include the position of the autonomous vehicle, defined in terms of a sub-lane within a lane through which the autonomous vehicle is travelling.

The setup interface 106 may determine the differences in the classifications of the independent variables (e.g., size of object, distance from object to vehicle (which may be broken down into lateral and longitudinal distance components), and lane structure) based on thresholds (e.g., a threshold size, a threshold distance, a threshold number of lanes or a threshold lane width, etc.). Regardless, the driving simulator 102 may classify the independent variables or the occlusion factors based on these corresponding thresholds, and capture data for creation of different models for different scenarios accordingly. In this way, the driving simulator 102 may record how humans react to potential occlusion scenarios, and thus, generalized learning may be performed to create keyframe models based thereon. The driving simulator 102 or one or more components thereof may be implemented via a processor or a processing unit on a computer, and/or stored on a memory, a storage device, etc., as will be described with reference to FIGS. 6-7 below.

Training Models Using Learning from Keyframes (LfK)

A keyframe model builder 110 may be utilized to build one or more sets of keyframe models based on the size of the occlusion object, the distance from the occlusion object to the autonomous vehicle, and the lane structure of the environment. For example, constraints for bidirectional road lane structures may be built stricter (than unidirectional road lane structures) and the outer edge may be built more conservative and to stick within its own lane allowance. Regardless, the keyframe model builder 110 may be utilized to train one or more keyframe models based on the independent variables or occlusion factors described above with reference to the simulation phase. Because the keyframe models are trained based on these features, they are associated with a cascaded architecture, which enables components of the system 100 for keyframe based autonomous vehicle operation to handle the complexity of the keyframe modeling. Keyframes within the keyframe model may be indicative of an associated driving parameter for a short trajectory (e.g., associated with a distance, such as 1 m or a time).

The keyframe model builder 110 may build one or more of the keyframe models in a manner which models both the behavior of the driver and the behavior of a pedestrian stepping out from behind the occlusion object, the keyframe model is a solution generalizable across different variations of the modeled scenario that have not necessarily been observed in practice or training. Stated another way, because the keyframe model is based on observations of the training driver (e.g., vehicle state information) and observations relating to the environment (e.g., environment state information), scenarios which were not recorded or encountered during the simulation phase may be accounted for on the fly. For example, even if the keyframe model builder 110 has only built a model based on scenarios associated with one road-side object (e.g., a single occlusion object), that model may be utilized to generate constraints for other scenarios, such as scenarios with multiple occlusion objects in sequence, as will be discussed herein. As used herein, constraint may mean a range or suggested range for a driving parameter. Examples of driving parameters may include a velocity, an acceleration, or a steering angle of the autonomous vehicle.

The keyframe model builder 110 may build one or more keyframe models to include one or more preconditions. A precondition, for example, may be a current state condition which may be matched prior to execution or use of the corresponding keyframe or keyframe model. In this way, artifacts (e.g., the preconditions or the primitives) may be used in conjunction to create task plans or keyframe models on the fly, during runtime, for reaching a goal (e.g., providing autonomous driving instructions or commands in the environment where occlusion objects exist). Additionally, the keyframe model builder 110 may transform the independent variables or occlusion factors as inputs into a canonical, ego-centric internal representation which isolates a working state from environmental changes (e.g., whether the occlusion object is on the left or right, a number of occlusion objects, etc.).

Figure 6:
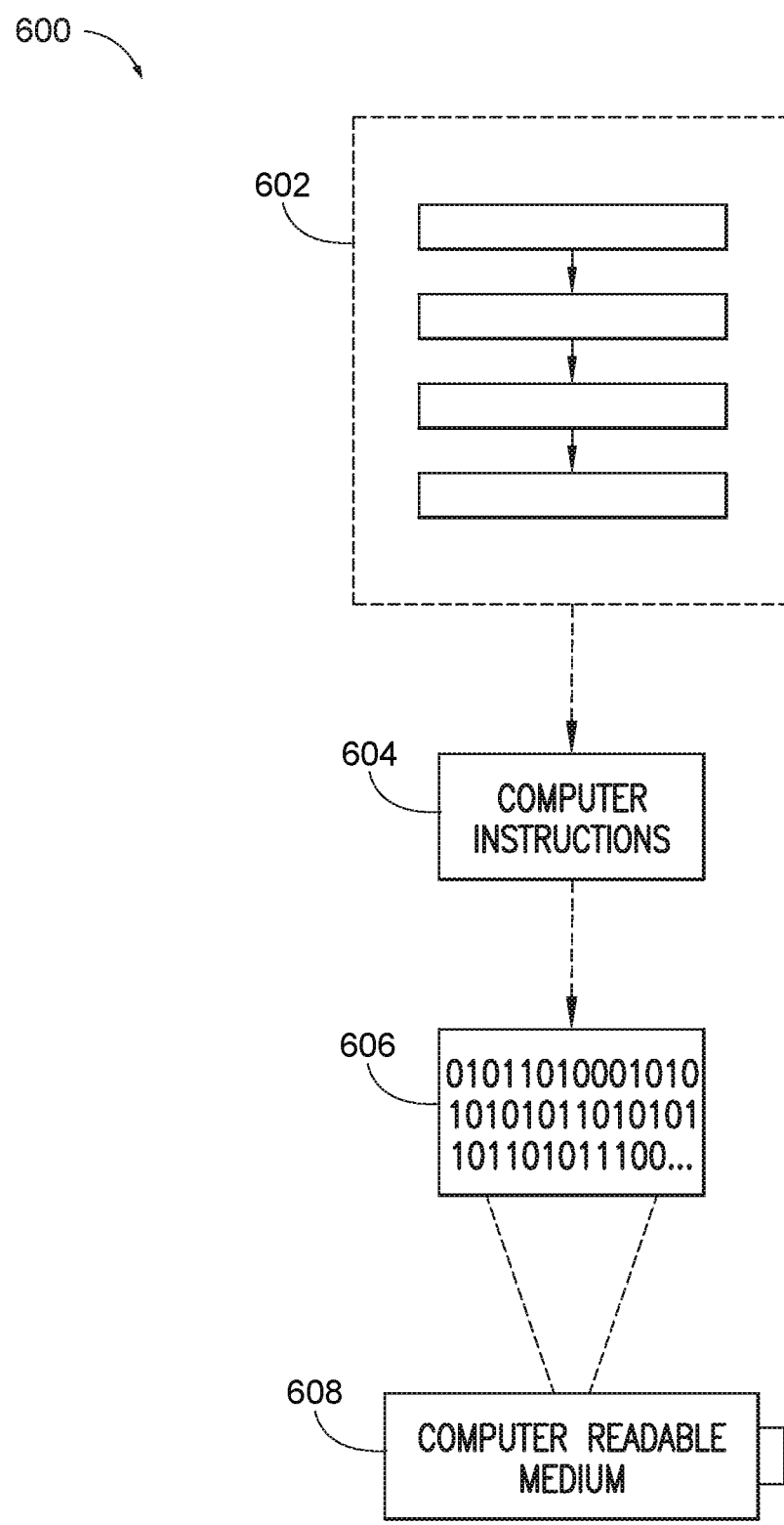
FIG. 6 is an illustration of an example computer-readable medium or computer-readable device including processor-executable instructions configured to embody one or more of the provisions set forth herein, according to one aspect.

According to one aspect, the keyframe model builder 110 may be implemented via a processor or a processing unit on a computer, and/or stored on a memory, a storage device, etc., as will be described with reference to FIGS. 6-7 below. Additionally, the keyframe model builder 110 may build one or more keyframe models using keyframes as task milestones or primitives. According to one aspect, the keyframe model builder 110 may build one or more of the keyframe models by breaking up tasks between learning sub-optimal constraints and optimization based planning. Further, one or more of the keyframe models or keyframes thereof may represent a library of primitives or primitive actions associated with the corresponding driving parameter. For example, there may be a set of keyframe models associated with each one of the velocity, the acceleration, or the steering angle of the autonomous vehicle, etc.

The keyframe models or sets of keyframe models may be stored on the database 112 of the server 114, and may be accessible by the system 100 for keyframe based autonomous vehicle operation, by autonomous vehicles, or by a mobile device (e.g., a smartphone, tablet, etc.) which may be in communication with the autonomous vehicle or system 100 for keyframe based autonomous vehicle operation.

Additionally, the keyframe model builder 110 may determine a $D_{thresh}$ based on one or more of the observed driving characteristics. As another example, the keyframe model builder 110 may use a predetermined $D_{thresh}$. According to other aspects, different driving parameters associated with different keyframe models may implement their own $D_{thresh}$. The keyframe model builder 110 may build the keyframe models while making a distinction between the nature of the road or lane structure and compared observations from similar traffic scenarios. In any event, $D_{thresh}$ may be a distance at which the human drivers generally begin to react to the occlusion object within the simulation.

Autonomous Driving

The system 100 for keyframe based autonomous vehicle operation may include a sensor 120, a feature extractor 130, a navigation device 140, a reasoning logic 142, a bus 150, and a controller 160. The controller 160 may control one or more components of the autonomous vehicle, such as a steering mechanism 162, a throttle mechanism 164, or a brake mechanism 166.

The sensor 120 may collect vehicle state information and environment state information and may include a radar unit, a light detection and ranging (LIDAR) unit, or an image capture sensor. For example, the vehicle state information may be information associated with an autonomous vehicle, such as a current heading or bearing, a current velocity, a current acceleration, a current steering angle, a current trajectory, a current position of the autonomous vehicle, etc. The environment state information may be information associated with the occlusion object located in the environment through which the autonomous vehicle is travelling. For example, the environment state information may be indicative of a size of the occlusion object, a position of the occlusion object relative to the autonomous vehicle, a distance between the occlusion object and the autonomous vehicle, a nature of a roadway, a lane structure of the environment, a number of lanes of the roadway, a road lane limit (e.g., lane width), etc.

The feature extractor 130 may extract or determine features associated with the vehicle state information or the environment state information to facilitate selection of a matching model. In other words, the features extracted by the feature extractor 130, may, for example, be used to most closely match to one of the eight models discussed above, according to one aspect. Stated another way, the feature extractor 130 may determine a size of the occlusion object, a distance between the occlusion object and the autonomous vehicle, and a lane structure of the environment through which the autonomous vehicle is travelling. These extracted features may correspond to one or more of the independent variables which were controlled by the setup interface 106 during the simulation phase described above. In any event, the features extracted by the feature extractor 130 (e.g., the size of the occlusion object, the distance between the occlusion object and the autonomous vehicle, a sub-lane position of the autonomous vehicle, and the lane structure) may be utilized by the reasoning logic 142, for example, to treat keyframes as a metric for progress, and thus, select the matching keyframe model accordingly. Stated another way, because the feature extractor 130 extracts the aforementioned features as keyframes or as primitives, these features may be viewed as progress markers which may be linearly combined, thereby enabling the reasoning logic 142 to select one or more matching keyframe models and piece or 'stitch' together multiple keyframes to form a cohesive model.

In this way, the keyframes or primitives may be utilized to custom fit a response (e.g., as the determined or generated driving parameters or other sets of constraints) to a sensed or detected scenario associated with one or more occlusion objects based on the selected keyframe models, thereby enabling the system 100 for keyframe based autonomous vehicle operation to act as a framework for constraint transfer across variations of the source task of determining driving parameters for different driving scenarios. Because of the way keyframes or primitives may be strung together, the reasoning logic 142 may learn variations to known allowable behavior, and implement these variations as constraints in the form of a modified suggested range for a given driving parameter during run-time (e.g., in real time). In this way, an optimal route may be provided while enhancing the safety for the autonomous vehicle and its occupants during autonomous operation.

The navigation device 140 may generate one or more trajectories for the autonomous vehicle, such as from an origin location to a destination location, and may generate or output trajectory and/or speed constraint envelopes as guidelines for trajectory planning on a global scale or otherwise provide top layer type navigation planning (e.g., generating a route from a first location to a second location based on map information, which may be stored on the server 114, including road network information). Stated another way, the navigation device 140 may generate a route from the first location to the second location. According to one aspect, the navigation device 140 may generate driving parameters, such as speed, velocity, acceleration, or other trajectory constraints for high level planning.

The reasoning logic 142 may facilitate low or mid-level decision making (e.g., selecting a sub-lane position, the velocity, the acceleration, the trajectory of the autonomous from second to second, etc.). In this way, the reasoning logic 142 may utilize the distance between the occlusion object and the autonomous vehicle as a factor in selecting the corresponding matching keyframe model, thereby providing an estimated indication of how real human drivers reacted to occlusion objects in similar scenarios. This enables the ECU 160 to command the autonomous vehicle to operate autonomously accordingly. The reasoning logic 142 may be setup architecturally to follow a funneled plan generation paradigm or otherwise to generate driving parameters which are optimized for run-time. For example, the reasoning logic 142 may sit in a middle layer of the hierarchy of navigation logic and generate speed and trajectory constraints as driving parameters for scenarios detected by the sensor 120, such as the detected occlusion objects (e.g., indicative of potential blind spots) and/or actual obstructions which appear from behind the occlusion objects. Therefore, according to one aspect, the constraints or driving parameters generated by the reasoning logic 142 may be utilized to supplement or replace the driving parameters generated by the navigation device 140.

Stated another way, the reasoning logic 142 may select a matching keyframe model from a set of keyframe models based on the size of the occlusion object, the distance from the occlusion object to the autonomous vehicle, the lane structure of the environment, and the vehicle state information and generate a maximum suggested limit and a minimum suggested limit for a driving parameter associated with autonomous vehicle operation based on the selected keyframe model, the vehicle state information, the size of the occlusion object, the distance from the occlusion object to the autonomous vehicle, and the lane structure of the environment.

The reasoning logic 142 may select the matching keyframe model by treating a trajectory as a curve to extrapolate. Different order splines may be used to interpolate an input trajectory using start and end points and then adding a trajectory point with the most error as an intermediate keyframe. Stated another way, a set first and last point of the trajectories associated with the observed driving characteristics may be fit to a spline (e.g., cubic, fifth order, etc.). The mean, the variance and other statistical measures are considered when determining the upper and lower bounds as the maximum and the minimum suggested limits for a given driving parameter. This ordered tuple of ($\mu K_x$, $\sigma K_x$) is saved as the keyframe model. This may be repeated until the error between the extrapolated trajectory and the actual trajectory is less than a predetermined threshold. In this way, the keyframe models may act as task milestone identifiers where keyframes are aligned and clustered to provide mean keyframes, which may then be utilized to extrapolate a trajectory or other driving parameters at run-time or in real-time. Because the reasoning logic 142 treats the keyframes or keyframe models as milestones, these milestones may be viewed as a metric for progress and as a checkpoint for execution.

For example, the sensor 120 may continuously collect vehicle state information associated with the autonomous vehicle and environment state information including information associated with the occlusion object located in the environment through which the autonomous vehicle is travelling. The feature extractor 130 may continuously determine the size of the occlusion object, the distance between the occlusion object and the autonomous vehicle, and the lane structure of the environment through which the autonomous vehicle is travelling. The reasoning logic 142 may continuously select the matching keyframe model from the set of keyframe models based on the size of the occlusion object, the distance from the occlusion object to the autonomous vehicle, the lane structure of the environment, and the vehicle state information. The reasoning logic 142 may also continuously generate maximum suggested limits and minimum suggested limits for the driving parameter based on the selected keyframe model, the vehicle state information, the size of the occlusion object, the distance from the occlusion object to the autonomous vehicle, and the lane structure of the environment.

Because the keyframes may be viewed as progress markers, the reasoning logic 142 may generate constraints (e.g., the maximum suggested limit and the minimum suggested limit for the driving parameters) for various driving scenarios with multiple occlusion objects by linearly combining the respective keyframes for corresponding driving scenarios together. Stated another way, the reasoning logic 142 may 'plug-and-play' or 'cut-and-paste' individual keyframes, sets of keyframes, or subsets of keyframes to generate sets of parameters, such as a maximum suggested limit or a minimum suggested limit for the driving parameter accordingly. In this way, the actions associated with each keyframe may be connected together in different ways to solve tasks within a domain.

In any event, the reasoning logic 142 may receive a current position of the autonomous vehicle (e.g., which may include a sub-lane of the autonomous vehicle), a position of the occlusion object or object, a current heading of the autonomous vehicle, a current velocity of the autonomous vehicle, a size associated with the occlusion object, a type of road or lane structure associated with the environment and output or otherwise generate one or more driving parameters. For each driving parameter, the reasoning logic 142 may generate, the maximum suggested limit and the minimum suggested limit as a suggested operating range within a time period or time horizon (e.g., 5 seconds). The time horizon and current speed may be used by the reasoning logic 142 to calculate the corresponding distance horizon, egocentric values of stored variances, and the cubic spline of the matching keyframe model to create the suggested boundaries or limits as extrapolated curves over a distance horizon, as indicated by the x-axis in FIGS. 4A-4B.

The controller 160 may be an electronic control unit (ECU) of the autonomous vehicle. The ECU 160 or controller may command the autonomous vehicle to operate autonomously according to the maximum suggested limit and the minimum suggested limit for the driving parameter. This may be done at one or more time intervals or one or more position intervals, as indicated by the lines along the x-axis (e.g., in a vertical direction or up-down direction) in FIGS. 4A-4B. In any event, the ECU 160 may cause aspects of the matching keyframe model to be executed on a corresponding vehicle component (e.g., if the driving parameter for an upcoming keyframe relates to velocity and is greater than a current velocity of the vehicle, increasing the throttle). Stated another way, the ECU 160 may implement autonomous driving according to the matching keyframe model by changing the state of one or more of the vehicle components (i.e., the steering mechanism 162, the throttle mechanism 164, or the brake mechanism 166) of the autonomous vehicle, such as when the autonomous vehicle is within a $D_{thresh}$ of the occlusion object. In this way, the ECU 160 may command the autonomous vehicle to operate autonomously according to the maximum suggested limit and the minimum suggested limit for the driving parameter when the position of the autonomous vehicle is less than the threshold distance ($D_{thresh}$) to the position of the occlusion object.

According to one or more aspects, the system 100 for keyframe based autonomous vehicle operation may detect two or more occlusion objects in sequence, such as a first occlusion object, a second occlusion object, etc. In other words, the environment state information collected by the sensor 120 may include information associated with the first occlusion object and the second occlusion object located in the environment through which the autonomous vehicle is travelling. The feature extractor 130 may determine a size of the second occlusion object, a distance between the second occlusion object and the autonomous vehicle. As previously discussed, these distances may be broken down into latitudinal and longitudinal components. The reasoning logic 142 may select matching keyframe model(s) from a set of keyframe models based on the size of the second occlusion object, the distance from the second occlusion object to the autonomous vehicle, the lane structure of the environment, and the vehicle state information. Using the selected keyframe model(s), the reasoning logic 142 may generate maximum and minimum suggested limits for a driving parameter associated with autonomous vehicle operation based on the selected keyframe model(s), the vehicle state information, the size of the second occlusion object, the distance from the second occlusion object to the autonomous vehicle, and the lane structure of the environment.

According to one aspect, the reasoning logic 142 may treat subsequent occlusion objects as an isolated object having its own threshold distance ($D_{thresh}$). If the first occlusion object and the second occlusion object are at enough distance from one another such that $D_{thresh1}$ (corresponding to the first occlusion object) and $D_{thresh2}$ (corresponding to the second occlusion object) and respective active behavior time do not collide, the reasoning logic 142 may implement corresponding keyframe models separately. However, if the first occlusion object and the second occlusion object are at a distance from one another such that $D_{thresh1}$ (corresponding to the first occlusion object) and $D_{thresh2}$ (corresponding to the second occlusion object) and respective active behavior time do overlap, the reasoning logic 142 may implement corresponding keyframe models together, such as by generating constraints (e.g., the maximum and minimum suggested limits for the driving parameter) using keyframes from the first occlusion object up to the center point of the first occlusion object $CP_{h1}$, and string this together with keyframes from the second occlusion object to the center point of the second occlusion object $CP_{h2}$ (which lie after $CP_{h1}$). The reasoning logic 142 may string the keyframes associated with the first occlusion object and the second occlusion object together based on third order splines. In other words, cubic splines may be used to combine multiple sets of keyframes together.

According to one aspect, the reasoning logic 142 may implement corresponding keyframe models by determining an average point ($AP_{(h1,h2)}$) between the center point of the first occlusion object $CP_{h1}$ and the center point of the second occlusion object $CP_{h2}$. For example, this may be a distance from an average centered position of the first object and the second object to the autonomous vehicle. Here, the reasoning logic 142 may treat the first occlusion object and the second occlusion object as isolated objects and retrieve variance keyframes in a global domain. The reasoning logic 142 may select all h1 keyframes with a forward component less than $AP_{(h1,h2)}$ and stack these below keyframes for h2 with a forward component greater than $AP_{(h1,h2)}$. This combination may be utilized with cubic splines to generate the constraints for the overlapping occlusion objects.

Figure 2:
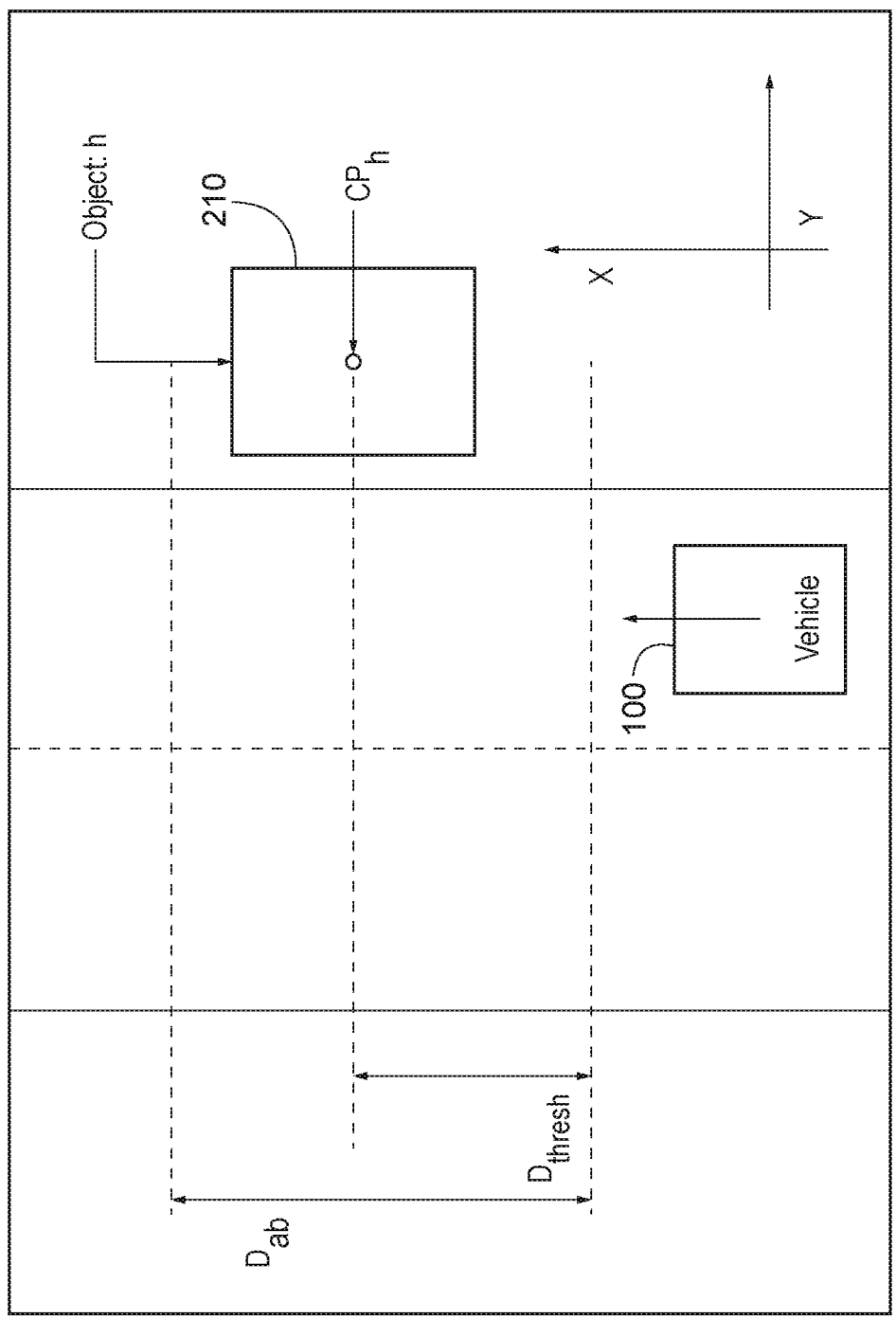
FIG. 2 is an illustration of an exemplary usage scenario for the system for keyframe based autonomous vehicle operation of FIG. 1.

FIG. 2 is an illustration of an exemplary usage scenario for the system 100 for keyframe based autonomous vehicle operation of FIG. 1. As previously discussed above, the $D_{thresh}$ may be implemented so that each driving parameter has its own $D_{thresh}$, although $D_{thresh}$ may be shared among the driving parameters. In any event, the $D_{thresh}$ may be indicative of a distance at which the human drivers react to an occlusion object 210 (e.g., associated with the possibility of a pedestrian or obstacle).

According to one aspect, the ECU 160 may command the autonomous vehicle to operate autonomously according to the maximum suggested limit and the minimum suggested limit for the driving parameter when a position of the autonomous vehicle is less than a threshold distance, such as $D_{thresh}$, to a position of the occlusion object 210. Stated another way, once the autonomous vehicle reaches $D_{thresh}$, the ECU 160 may activates the constraints associated with the driving parameter. These driving parameters may remain activated or engaged while the autonomous vehicle moves a distance $D_{ab}$ (i.e., the distance while engaged in active behavior associated with the keyframe model). During the activation of these driving parameters, the reasoning logic 142 takes a snapshot of current features or driving parameters and transforms these driving parameters into an egocentric dimension. As seen in FIG. 2, the occlusion object 210 may be a hazard h associated with two factors: a size, and a center position, $CP_h$.

However, after the occlusion object 210 is passed, the ECU 160 may implement other ranges or suggested limits for the driving parameter. In other words, ECU may command the autonomous vehicle to disregard the maximum suggested limit and the minimum suggested limit for the driving parameter after the autonomous vehicle has passed the occlusion object 210 but is still within the threshold distance to the position of the occlusion object 210, such as when a threshold distance $D_{ab}$ is traveled.

Figure 3A:
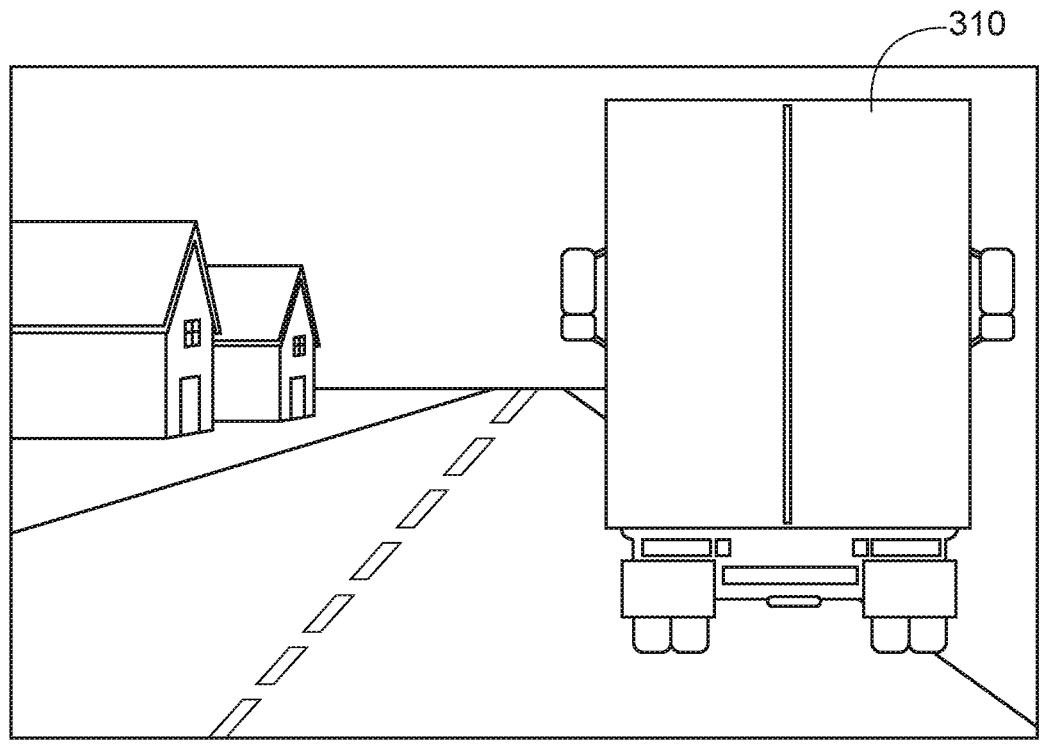
FIGS. 3A-3B are illustrations of an exemplary training scenario in association with the system for keyframe based autonomous vehicle operation of FIG. 1.
Figure 3B:
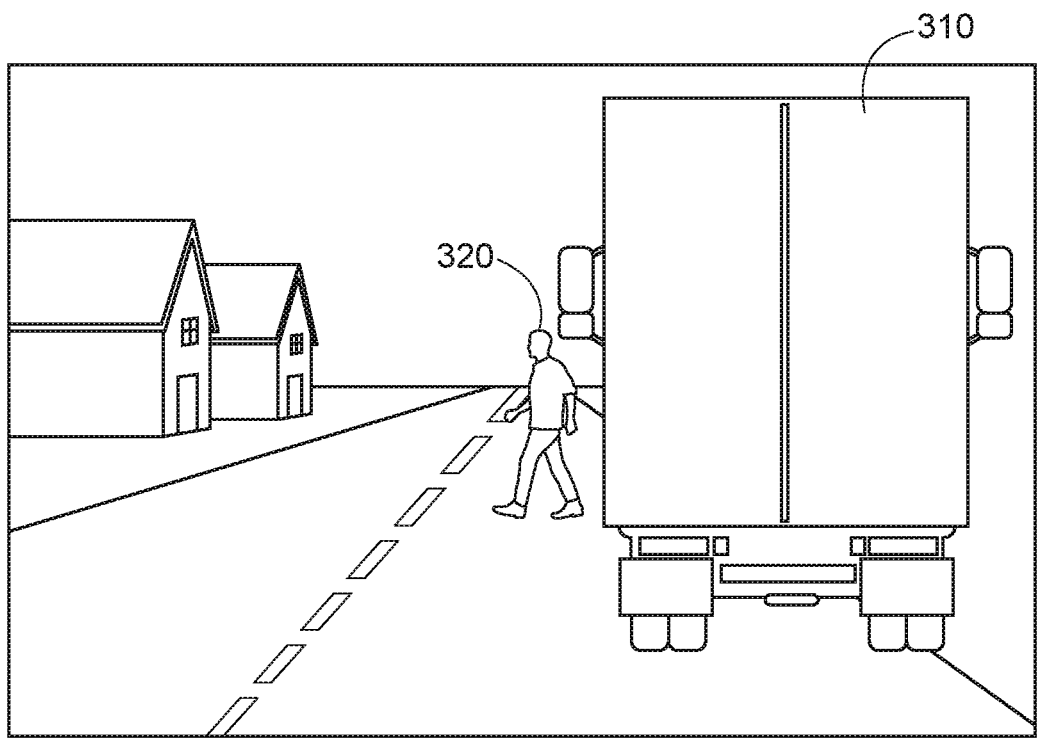

FIGS. 3A-3B are illustrations of an exemplary training scenario in association with the system 100 for keyframe based autonomous vehicle operation of FIG. 1. As seen in FIG. 3A, the occlusion object 310 may represent a potential blind spot scenario where a pedestrian 320 may step out from behind the occlusion object. This is depicted in FIG. 3B. As previously discussed, during the training or simulation phase, information, such as vehicle characteristics may be recorded or stored during trial runs by human drivers, and this information may be used to build keyframe models. Autonomous vehicles may operate based on these keyframe models.

Figure 4A:
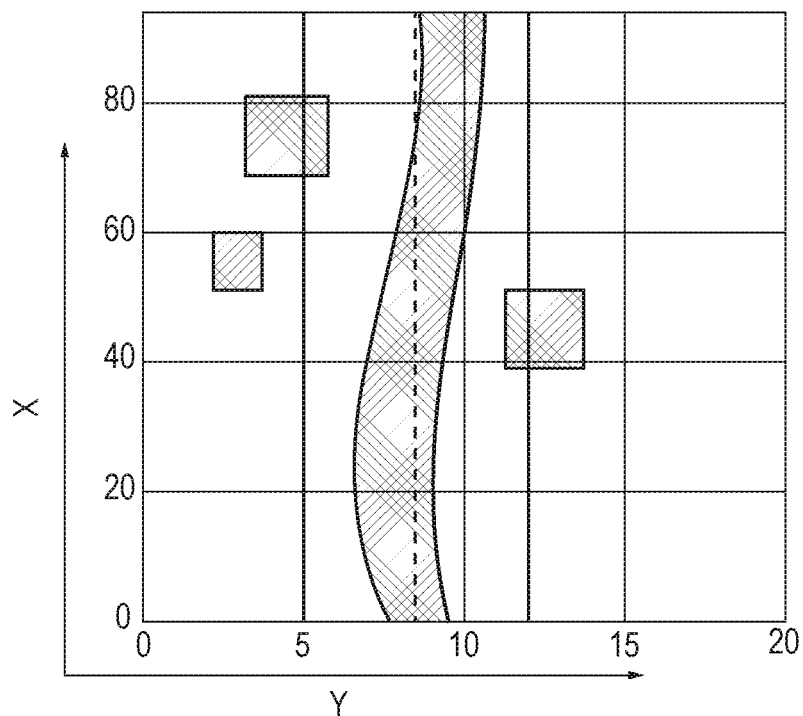
FIGS. 4A-4B are illustrations of an exemplary usage scenario in association with the system for keyframe based autonomous vehicle operation of FIG. 1.
Figure 4B:
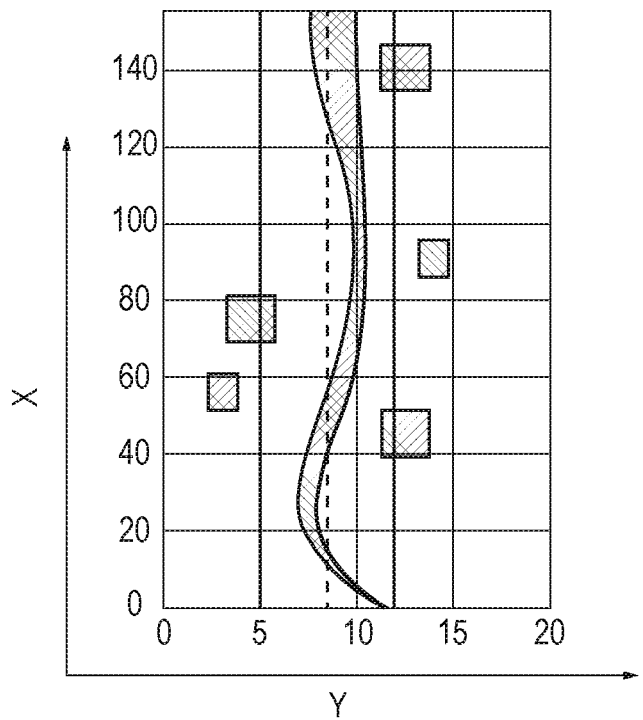

FIGS. 4A-4B are illustrations of an exemplary usage scenario in association with the system 100 for keyframe based autonomous vehicle operation of FIG. 1. FIGS. 4A-4B are exemplary boundaries (e.g., maximum suggested limits and minimum suggested limits) for different driving parameters. As seen in FIGS. 4A-4B, the ranges associated with the envelope (e.g., between the maximum suggested limit and the minimum suggested limit) are not necessarily symmetrical. While the right bound of FIG. 4B is a tighter bound with less steering movement, the left bound is curvier and weighted more towards "evading" the objects. These contrasting boundaries represent different stereo-types of drivers, such as goal-oriented ones with minimum possible motion and safety-oriented ones with exaggerated motions. According to one aspect, LfD may be implemented to suit behavior to a user based on demographics of the user or occupant of the autonomous vehicle. By recording the user's preference of behaviors, the framework of the system 100 for keyframe based autonomous vehicle operation may update the keyframe and variance models to reflect the user preferences, thereby pushing the behavior controller to implement driving parameters associated with one of the two extremes (e.g., minimum or maximum).

Figure 5:
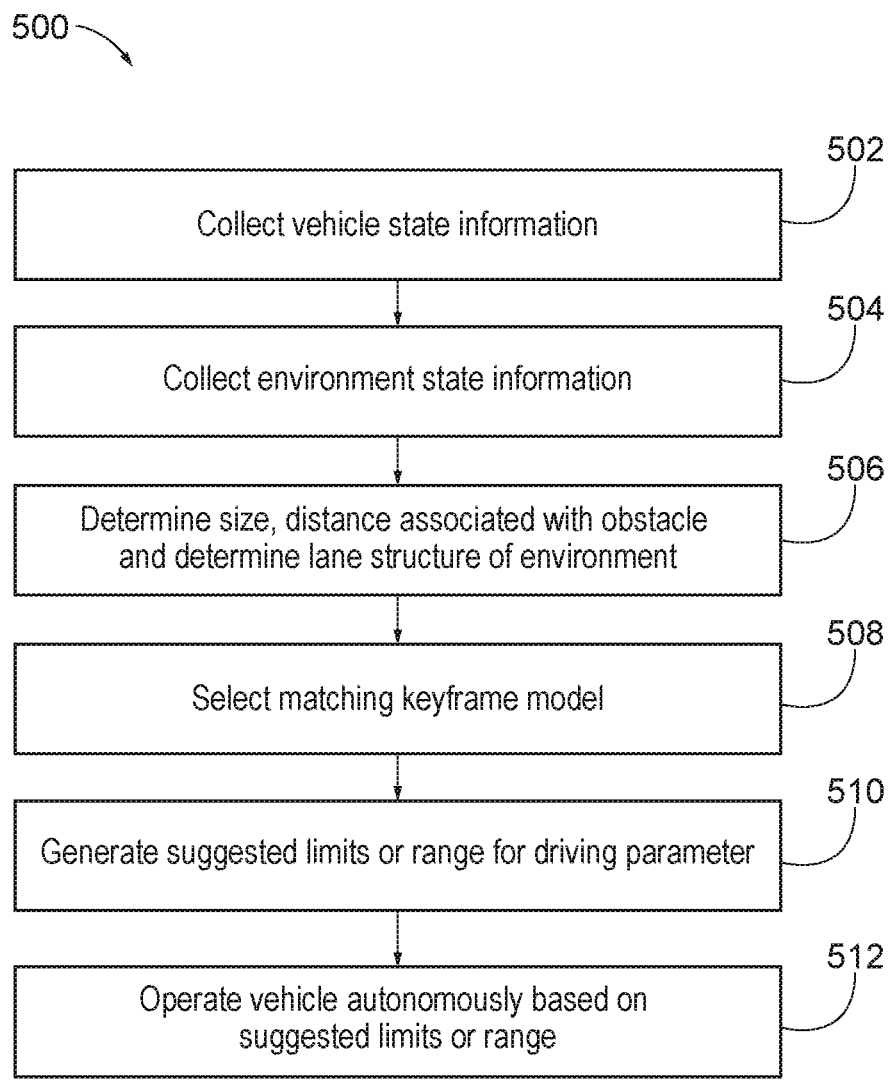
FIG. 5 is an illustration of an example flow diagram of a method for keyframe based autonomous vehicle operation, according to one aspect.

FIG. 5 is an illustration of an example flow diagram of a method for keyframe based autonomous vehicle operation, according to one aspect. The method may include collecting 502 vehicle state information associated with an autonomous vehicle and collecting 504 environment state information including information associated with an object located in the environment through which the autonomous vehicle is travelling, determining 506 a size of the object, a distance between the object and the autonomous vehicle, and a lane structure of the environment through which the autonomous vehicle is travelling, selecting 508 a matching keyframe model from a set of keyframe models based on the size of the object, the distance from the object to the autonomous vehicle, the lane structure of the environment, and the vehicle state information, generating 510 a maximum suggested limit and a minimum suggested limit for a driving parameter associated with autonomous vehicle operation based on the selected keyframe model, the vehicle state information, the size of the object, the distance from the object to the autonomous vehicle, and the lane structure of the environment, and commanding the autonomous vehicle to operate 512 autonomously according to the maximum suggested limit and the minimum suggested limit for the driving parameter.

Still another aspect involves a computer-readable medium including processor-executable instructions configured to implement one aspect of the techniques presented herein. An embodiment of a computer-readable medium or a computer-readable device devised in these ways is illustrated in FIG. 6, wherein an implementation 600 includes a computer-readable medium 608, such as a CD-R, DVD-R, flash drive, a platter of a hard disk drive, etc., on which is encoded computer-readable data 606. This encoded computer-readable data 606, such as binary data including a plurality of zero's and one's as shown in 606, in turn includes a set of processor-executable computer instructions 604 configured to operate according to one or more of the principles set forth herein. In one such embodiment 600, the processor-executable computer instructions 604 may be configured to perform a method 602, such as the method 500 of FIG. 5. In another aspect, the processor-executable computer instructions 604 may be configured to implement a system, such as the system 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 7:
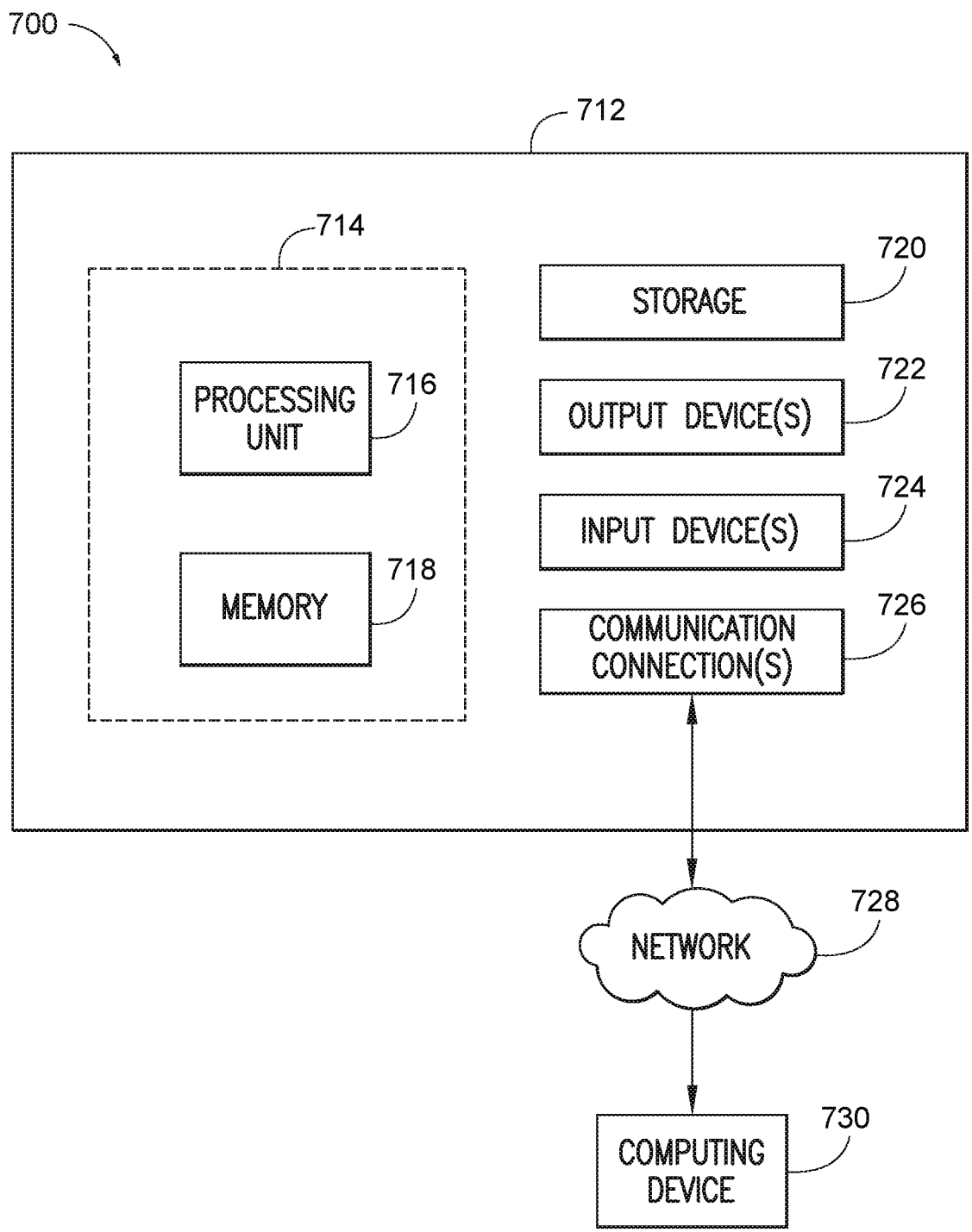
FIG. 7 is an illustration of an example computing environment where one or more of the provisions set forth herein are implemented, according to one aspect.

FIG. 7 and the following discussion provide a description of a suitable computing environment to implement aspects of one or more of the provisions set forth herein. The operating environment of FIG. 7 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, embodiments or aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 7 illustrates a system 700 including a computing device 712 configured to implement one aspect provided herein. In one configuration, computing device 712 includes at least one processing unit 716 and memory 718. Depending on the exact configuration and type of computing device, memory 718 may be volatile, such as RAM, non-volatile, such as ROM, flash memory, etc., or a combination of the two. This configuration is illustrated in FIG. 7 by dashed line 714.

In other aspects, computing device 712 includes additional features or functionality. For example, computing device 712 may include additional storage such as removable storage or non-removable storage, including, but not limited to, magnetic storage, optical storage, etc. Such additional storage is illustrated in FIG. 7 by storage 720. In one aspect, computer readable instructions to implement one aspect provided herein are in storage 720. Storage 720 may store other computer readable instructions to implement an operating system, an application program, etc. Computer readable instructions may be loaded in memory 718 for execution by processing unit 716, for example.

The term "computer readable media" as used herein includes computer storage media. Computer storage media includes volatile and nonvolatile, removable and non-removable media implemented in any method or technology for storage of information such as computer readable instructions or other data. Memory 718 and storage 720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by computing device 712. Any such computer storage media is part of computing device 712.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Computing device 712 includes input device(s) 724 such as keyboard, mouse, pen, voice input device, touch input device, infrared cameras, video input devices, or any other input device. Output device(s) 722 such as one or more displays, speakers, printers, or any other output device may be included with the computing device 712. Input device(s) 724 and output device(s) 722 may be connected to the computing device 712 via a wired connection, wireless connection, or any combination thereof. In one aspect, an input device or an output device from another computing device may be used as input device(s) 724 or output device(s) 722 for computing device 712. The computing device 712 may include communication connection(s) 726 to facilitate communications with one or more other devices 730, such as through network 728, for example.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for keyframe based autonomous vehicle operation, comprising:
   a sensor collecting vehicle state information associated with an autonomous vehicle and environment state information, the environment state information including information associated with an occlusion object located in an environment through which the autonomous vehicle is travelling;
   a feature extractor, implemented via a processor of an electronic control unit (ECU), determining a size of the occlusion object, a distance between the occlusion object and the autonomous vehicle, and a lane structure of the environment through which the autonomous vehicle is travelling;
   a reasoning logic, implemented via the processor of the ECU:
      selecting a matching keyframe model from a set of keyframe models based on the size of the occlusion object, the distance from the occlusion object to the autonomous vehicle, the lane structure of the environment, and the vehicle state information; and
      generating a maximum suggested limit and a minimum suggested limit for a driving parameter associated with autonomous vehicle operation based on the selected keyframe model, the vehicle state information, the size of the occlusion object, the distance from the occlusion object to the autonomous vehicle, and the lane structure of the environment; and
   wherein the ECU commands the autonomous vehicle to operate autonomously according to the maximum suggested limit and the minimum suggested limit for the driving parameter.

2. The system for keyframe based autonomous vehicle operation of claim 1, wherein the vehicle state information includes a position of the autonomous vehicle, a heading of the autonomous vehicle, and a velocity of the autonomous vehicle.

3. The system for keyframe based autonomous vehicle operation of claim 1, wherein the environment state information includes a position of the occlusion object.

4. The system for keyframe based autonomous vehicle operation of claim 1, wherein the lane structure of the environment includes a two lane road structure or a four lane road structure.

5. The system for keyframe based autonomous vehicle operation of claim 1, wherein the ECU commands the autonomous vehicle to operate autonomously according to the maximum suggested limit and the minimum suggested limit for the driving parameter when a position of the autonomous vehicle is less than a threshold distance to a position of the occlusion object.

6. The system for keyframe based autonomous vehicle operation of claim 5, wherein the ECU commands the autonomous vehicle to disregard the maximum suggested limit and the minimum suggested limit for the driving parameter after the autonomous vehicle has passed the occlusion object but is within the threshold distance to the position of the occlusion object.

7. The system for keyframe based autonomous vehicle operation of claim 1, wherein the set of keyframe models are based on third order splines or fifth order splines.

8. The system for keyframe based autonomous vehicle operation of claim 1, wherein the vehicle state information includes a position of the autonomous vehicle which is defined in terms of a sub-lane within a lane through which the autonomous vehicle is travelling.

9. The system for keyframe based autonomous vehicle operation of claim 1, wherein the sensor includes a radar unit, a light detection and ranging (LIDAR) unit, or an image capture sensor.

10. The system for keyframe based autonomous vehicle operation of claim 1, wherein the driving parameter is a velocity, an acceleration, or a steering angle of the autonomous vehicle.

11. A system for keyframe based autonomous vehicle operation, comprising:
    a sensor collecting vehicle state information associated with an autonomous vehicle and environment state information, the environment state information including information associated with an object located in an environment through which the autonomous vehicle is travelling;
    a feature extractor, implemented via a processor of an electronic control unit (ECU), determining a size of the object, a distance between the object and the autonomous vehicle, and a lane structure of the environment through which the autonomous vehicle is travelling;
    a reasoning logic, implemented via the processor of the ECU:
       selecting a matching keyframe model from a set of keyframe models based on the size of the object, the distance from the object to the autonomous vehicle, the lane structure of the environment, and the vehicle state information; and
       generating a maximum suggested limit and a minimum suggested limit for a driving parameter associated with autonomous vehicle operation based on the selected keyframe model, the vehicle state information, the size of the object, the distance from the object to the autonomous vehicle, and the lane structure of the environment; and
    wherein the ECU commands the autonomous vehicle to operate autonomously according to the maximum suggested limit and the minimum suggested limit for the driving parameter.

12. The system for keyframe based autonomous vehicle operation of claim 11, wherein the ECU commands the autonomous vehicle to operate autonomously according to the maximum suggested limit and the minimum suggested limit for the driving parameter when a position of the autonomous vehicle is less than a threshold distance to a position of the object.

13. The system for keyframe based autonomous vehicle operation of claim 11, wherein the set of keyframe models are based on third order splines or fifth order splines.

14. The system for keyframe based autonomous vehicle operation of claim 11, wherein the vehicle state information includes a position of the autonomous vehicle which is defined in terms of a sub-lane within a lane through which the autonomous vehicle is travelling.

15. The system for keyframe based autonomous vehicle operation of claim 11, wherein the sensor includes a radar unit, a light detection and ranging (LIDAR) unit, or an image capture sensor.

16. The system for keyframe based autonomous vehicle operation of claim 11, wherein the driving parameter is a velocity, an acceleration, or a steering angle of the autonomous vehicle.

17. A computer implemented method for keyframe based autonomous vehicle operation, comprising executing, via a processor of an electronic control unit (ECU):
　collecting vehicle state information associated with an autonomous vehicle and environment state information, the environment state information including information associated with an object located in an environment through which the autonomous vehicle is travelling;
　determining a size of the object, a distance between the object and the autonomous vehicle, and a lane structure of the environment through which the autonomous vehicle is travelling;
　selecting a matching keyframe model from a set of keyframe models based on the size of the object, the distance from the object to the autonomous vehicle, the lane structure of the environment, and the vehicle state information;
　generating a maximum suggested limit and a minimum suggested limit for a driving parameter associated with autonomous vehicle operation based on the selected keyframe model, the vehicle state information, the size of the object, the distance from the object to the autonomous vehicle, and the lane structure of the environment; and
　commanding the autonomous vehicle to operate autonomously according to the maximum suggested limit and the minimum suggested limit for the driving parameter.

18. The computer implemented method of claim 17, comprising:
　collecting environment state information including information associated with a second object located in the environment through which the autonomous vehicle is travelling;
　determining a size of the second object and a distance between the second object and the autonomous vehicle; and
　selecting the keyframe model from the set of keyframe models based on the size of the object and the size of the second object, a distance from an average centered position of the object and the second object to the autonomous vehicle, the lane structure of the environment, and the vehicle state information.

19. The computer implemented method of claim 17, wherein the vehicle state information includes a position of the autonomous vehicle, a heading of the autonomous vehicle, and a velocity of the autonomous vehicle.

20. The computer implemented method of claim 17, wherein the environment state information includes a position of the object.

* * * * *